Patented Aug. 14, 1951

2,564,632

UNITED STATES PATENT OFFICE 2,564,632

EMULSION POLYMERIZATION WITH PENTAZDIENES

John E. Wicklatz, Cincinnati, Ohio, assignor to Phillips Petroleum Company, a corporation of Delaware No Drawing. Application June 2, 1947, Serial No. 752,005

22 Claims. (Cl. 260—84.7)

This invention relates to the polymerization of unsaturated organic compounds capable of undergoing an addition polymerization to form high molecular weight polymers. In one of its more specific aspects it relates to the polymerization of an aliphatic conjugated diene hydrocarbon, including substituted derivatives, either alone or in admixture with a monomer copolymerizable therewith, to form long chain polymers of the type known as synthetic rubbers. In a still more specific aspect it relates to the polymerization of a butadiene-1,3 hydrocarbon and a monomer copolymerizable therewith in an aqueous dispersion.

Numerous recipes have been developed for carrying out emulsion polymerization reactions to yield products possessing rubber-like characteristics. Various modifications of basic recipes have been introduced in order to impart desirable properties to polymeric materials and to make them adaptable for a wide variety of uses. In all polymerization processes it is requisite from an economic viewpoint that the reaction proceed as rapidly as possible without impairing product quality. While one method of increasing conversion rate is to increase the reaction temperature, such a procedure is inadvisable on account of the detrimental effect on the properties of the polymer. An alternative procedure is to employ an additive agent which will serve as an initiator or promoter for the reaction.

I have now found a method whereby emulsion polymerization reactions can be carried out at satisfactory conversion rates by the incorporation of a pentazdiene into the polymerization recipe. According to the process of this invention the polymerization of a polymerizable organic monomeric material, either comprising a single monomer or a mixture of one monomer with one or more other monomers copolymerizable therewith, is effected in aqueous emulsion in the presence of a pentazdiene which serves as an initiator for the reaction and thereby shortens the time required to reach a given conversion.

The monomeric material polymerized to produce synthetic rubber by the process of this invention comprises unsaturated organic compounds which generally contain the characteristic structure $CH_2=C<$ and, in most cases, have at least one of the disconnected valencies attached to an electronegative group, that is, a group which increases the polar character of the molecult such as a chlorine group or an organic group containing a double or triple bond such as vinyl, phenyl, nitrile, carboxy or the like. Included in this class of monomers are the conjugated butadienes or 1,3-butadienes such as butadiene (1,3-butadiene), 2,3-dimethyl-1,3-butadiene, isoprene, piperylene, 3-furyl-1,3-butadiene, 3-methoxy-1,3-butadiene, and the like; haloprenes, such as chloroprene, (2-chloro-1,3-butadiene) bromoprene, methyl chloroprene (2-chloro-3-methyl-1,3-butadiene), and the like; aryl olefins such as styrene, various alkyl styrenes, p-chloro styrene, p-methoxy styrene, alpha-methyl styrene, vinyl naphthalene and similar derivatives thereof, and the like; acrylic and substituted acrylic acids and their esters, nitriles and amides such as acrylic acid, methacrylic acid, methyl acrylate, ethyl acrylate, methyl alpha-chloroacrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinylethinyl alkyl carbinols, vinyl acetate, vinyl chloride, vinylidene chloride, vinyl furane, vinyl carbazole, vinyl acetylene and other unsaturated hydrocarbons, esters, alcohols, acids, ethers, etc., of the types described. Such unsaturated compounds may be polymerized alone, in which case simple linear polymers are formed, or mixtures of two or more of such compounds which are copolymerizable with each other in aqueous emulsion may be polymerized to form linear copolymers.

The process of this invention is particularly effective when the monomeric material polymerized is a polymerizable aliphatic conjugated diolefin or a mixture of such a conjugated diolefin with lesser amounts of one or more other compounds containing an active $CH_2=C<$ group which are copolymerizable therewith such as aryl olefins, acrylic and substituted acrylic acids, esters, nitriles and amides, methyl isopropenyl ketone, vinylidene chloride and similar compounds mentioned hereinabove. In this case the products of the polymerization are high molecular weight linear polymers and copolymers which are rubbery in character and may be called synthetic rubber. Although, as can be readily deduced from the foregoing, there is a host of possible reactants, the most readily and commercially available monomers at present are butadiene itself (1,3-butadiene) and styrene. The invention will, therefore, be more particularly discussed and exemplified with reference to these typical reactants.

One object of this invention is to polymerize unsaturated organic compounds.

Another object of this invention is to produce an improved synthetic rubber.

A further object of this invention is to produce a synthetic rubber by polymerization of monomeric material in aqueous emulsion at temperatures lower than ordinarily used.

Still another object of this invention is to increase the reaction rate in polymerizing unsaturated organic compounds in aqueous emulsion.

An additional object of this invention is to use pentazdienes as catalysts for organic reactions.

A still further object of this invention is to provide improved initiators for emulsion polymerization of monomeric material.

Other objects and advantages of this invention will become apparent, to one skilled in the art, from the accompanying disclosure and discussion.

The pentazdienes used in the practice of this invention may be represented by the formula

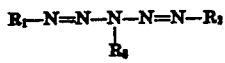

wherein $R_1$ and $R_2$ are aryl or substituted aryl radicals in which the substituents may be alkyl, alkoxy, halo, nitro, cyano, and the like, wherein $R_1$ and $R_2$ may be either alike or different, and wherein $R_3$ may be hydrogen, an alkyl, cycloalkyl, aryl, or substituted alkyl or aryl radical. Some examples of these compounds are: 1,3,5-triphenyl - 1,4 - pentazdiene, 1,5 - di - p - tolyl - 3 - lauryl - 1,4 - pentazdiene, 1,3 - di - p - tolyl - 5 - phenyl - 1,4 - pentazdiene, 1,3,5 - tri - p - chlorophenyl - 1,4 - pentazdiene, 1,3,5 - tri - p - tolyl - 1,4 - pentazdiene, and 1,5 - di - p - tolyl - 3-(beta-hydroxyethyl) -1,4-pentazdiene.

The initiators herein described may be prepared by the diazotization of an amine followed by a coupling reaction of the resulting product with an additional quantity of the amine or with a different amine. In a more specific embodiment and for the first step in the pentazdiene synthesis, the amine is diazotized by dissolving it in a suitable solvent such as methanol, adding concentrated hydrochloric acid, and then introducing an aqueous solution of sodium nitrite dropwise while the temperature of the reaction mixture is held at around 0° C., say in the range from about —5° to about +5° C., the temperature generally being controlled by any conventional external cooling means. The reactants are stirred or otherwise agitated during the addition of the sodium nitrite and stirring is continued until the reaction is complete.

For the second step of the synthesis an alkaline, alcoholic solution of an amine is prepared for coupling with the diazotized material obtained in the first step. The amine and an alkali metal hydroxide such as potassium hydroxide are dissolved in methyl alcohol and the diazo solution prepared earlier is added dropwise to this mixture. If desired, a solution of ethylene glycol dimethyl ether in water may be employed in place of the alcohol for this second step of the process. The temperature of the coupling reaction is maintained at around —5° C., say in the range from about —10° to about 0° C., by any external cooling means or other method which will serve to control the reaction. Subsequent to the addition of the diazo solution the reactor contents are cooled further, say to around —15° to —20° C., or as much lower as necessary to effect separation of the pentazdiene, which is removed by any conventional method, such as filtration. The product thus separated is washed with ice water and dried after which purification may be accomplished, if desired, by recrystallization. One method of recrystallization comprises dissolving the crude product in a suitable solvent such as acetone, and adding ice water to precipitate the compound. Preparation of pentazdienes using various water-soluble materials, such as hydroxy and alkoxy-ethers is more fully disclosed and discussed in my copending application Serial No. 752,838, filed June 5, 1947, now U. S. Patent 2,530,497.

The pentazdiene initiators of this invention may be employed in any type emulsion polymerization recipe. Satisfactory conversion rates are obtained whether they are used alone or in the presence of modifiers such as primary, secondary, or tertiary mercaptans. They are particularly applicable in ferricyanide activated recipes such as, for example, neutral ferricyanide recipes or those wherein alkaline-reacting materials such as sodium hydroxide, trisodium phosphate, and the like are employed. These initiators can also be used in redox recipes, either in place of or in addition to the oxidizing agent.

The amount of pentazdiene used in a particular polymerization recipe depends upon the reaction temperature and the result desired and will usually range from about 0.2 to about 6.0 parts based on 100 parts of monomeric material charged.

The fact that the pentazdienes of my invention exert such pronounced initiating or promoting effects in emulsion polymerization reactions makes them adaptable for use in systems operated over a wide range of temperatures.

When operating according to the method of this invention temperatures may range from about —30 to about 70° C. with temperatures from about —10 to about 50° C. usually preferred. Obviously when polymerizations are carried out in aqueous emulsion in the absence of freezing point depressants, temperatures below the freezing point of water cannot be employed. The use of various additive agents, however, makes a process of the type disclosed herein applicable at lower temperatures, and, in fact, this is one of the distinct advantages of the present invention. An example of such a low temperature system is a glycerin-water solution, and the term "aqueous emulsion" should be construed to include the use of an aqueous medium comprising water and a sufficient amount of a water-soluble component, preferably organic, to lower the freezing point below the desired polymerization temperature, whether or not the actual polymerization temperature is above or below 0° C. It is generally preferred that the emulsion be of an "oil in water" type, with the ratio of aqueous medium to monomeric material between about 1.5:1 and about 2.75:1, in parts by weight. At low ratios the emulsions tend to have high viscosities and at high ratios the yield per unit volume of reactor per unit of time is low. In the practice of the invention suitable means will be necessary to establish and maintain an emulsion and to remove reaction heat to maintain a desired reaction temperature. The polymerization may be conducted in batches, semicontinuously, or continuously. The total pressure on the reactants is preferably at least as great as the total vapor pressure of the mixture, so that the initial reactants will be present in liquid phase.

Advantages of this invention are illustrated by the following examples. The reactants, and their proportions, and the other specific ingredients of the recipes are presented as being typical and should not be construed to limit the invention unduly.

Example I

The preparation of 1,3,5-tri-p-tolyl-1,4-pentazdiene was effected in the following manner: p-toluidine (2.68 grams) was dissolved in 50 ml. of methyl alcohol and the diazothization carried out by adding 5.25 ml. of concentrated hydrochloric acid followed by a solution of 1.75 grams sodium nitrite in 4 ml. water. The temperature of the reaction mixture was held at 0° C. by external cooling during the dropwise addition of the sodium nitrite. The mixture was stirred during the addition of the reactants and stirring was continued until the reaction was complete as evidenced by a negative starch-iodide test. A solution of 1.34 grams of p-toluidine and 4.9 grams of potassium hydroxide in 50 ml. of methanol was prepared and the diazo solution added dropwise to this mixture. The temperature of the coupling reaction was maintained at −5° C. by an external cooling bath. After the completion of the reaction the mixture was further cooled to −15° C., whereupon a yellow powder precipitated and was removed by filtration. The product was washed with ice water and dried. Purification of the pentazdiene was accomplished by dissolving the material in acetone, cooling to 0° C., and adding ice water to precipitate the product.

The tri-p-tolyl-pentazdiene prepared above was employed as an initiator in the following polymerization recipe:

| | Parts by weight |
|---|---|
| Butadiene | 72 |
| Styrene | 28 |
| Soap flakes | 5 |
| Water | 180 |
| Pentazdiene | 3.43 |

Polymerization was carried out at 50° C. using the conventional procedure. The following time-conversion data were obtained:

| Time, hours: | Conversion, per cent |
|---|---|
| 2 | 17.7 |
| 4½ | 41.4 |
| 7 | 62.6 |
| 9 | 83.7 |
| 11 | 90.6 |

When isoprene was used in place of butadiene in the above recipe, the polymerization proceeded at a satisfactory rate although somewhat more slowly than when butadiene was employed. When acrylonitrile was used in place of styrene, a considerably more rapid rate of reaction was observed than was obtained in the butadiene-styrene polymerization.

When 1,3,5 - tri - p - chlorophenyl - 1,4 - pentazdiene was used as the initiator in place of 1,3,5-tri-p-tolyl-1,4-pentazdiene in the butadiene-styrene polymerization, similar results to those given above were obtained.

Example II

A run was carried out using the recipe of Example I except that 0.343 part of the tri-p-tolyl-pentazdiene was added instead of 3.43 parts as used in the previous case. The results are presented in the following tabulation:

| Time, hours: | Conversion, per cent |
|---|---|
| 2 | 14.5 |
| 4½ | 26.4 |
| 7 | 37.5 |
| 9 | 53.5 |
| 11 | 62.1 |
| 18 | 80.6 |

Example III

The effect of 1,3,5-tri-p-tolyl-1,4-pentazdiene as an initiator was determined in the following ferricyanide recipe:

| | Parts by weight |
|---|---|
| Butadiene | 72 |
| Styrene | 28 |
| Soap flakes | 5 |
| Water | 180 |
| Potassium ferricyanide | 0.3 |
| Sodium sulfate | 0.2 |
| Primary dodecyl mercaptan | 0.5 |
| Pentazdiene | 3.43 |

Polymerization was carried out in the usual manner while the temperature was maintained at 50° C. An 85.3 per cent conversion was realized in 4½ hours.

Example IV

A study was made of the effect of 1,3,5-tri-p-tolyl-1,4-pentazdiene as an initiator in the following alkaline ferricyanide recipe:

| | Parts by weight |
|---|---|
| Butadiene | 72 |
| Styrene | 28 |
| Soap flakes | 5 |
| Water | 180 |
| Potassium ferricyanide | 0.3 |
| Trisodium phosphate | 0.3 |
| Primary dodecyl mercaptan | 0.5 |
| Pentazdiene | 3.43 |

The conventional polymerization technique was employed and the temperature was held at 50° C. The following time-conversion data were obtained:

| Time, hours: | Conversion, per cent |
|---|---|
| 2 | 3.3 |
| 4 | 29.4 |
| 6 | 56.0 |
| 8 | 67.7 |
| 12 | 78.2 |
| 14 | 80.1 |
| 20½ | 96.5 |

Example V

Three parallel runs were carried out using the recipe of Example I except that varying amounts of primary dodecyl mercaptan were added. The temperature was held at 50° C. throughout the reactions. The results are shown below:

| | Time, Hours | | | |
|---|---|---|---|---|
| | 2 | 5¼ | 7¼ | 11 |
| Conversion, per cent: Mercaptan used— | | | | |
| 0.25 part | 22.2 | 60.5 | 76.4 | 93.2 |
| 0.50 part | 20.0 | 65.0 | 92.0 | |
| 1.00 part | 19.1 | 62.2 | 90.8 | |

Similar results were obtained when 1,5-diphenyl-3-p-tolyl-1,4-pentazdiene was added as the initiator in place of 1,3,5-tri-p-tolyl-1,4-pentazdiene.

Example VI

A chloroprene polymer was prepared according to the following recipe using 1,3,5-tri-p-tolyl-1,4-pentazdiene as the initiator:

| | Parts by weight |
|---|---|
| Chloroprene | 100 |
| Soap flakes | 5 |
| Water | 180 |
| Pentazdiene | 3.43 |
| Primary dodecyl mercaptan | 0.5 |

A rapid rate of polymerization was obtained and the polymer produced was of good plasticity.

Example VII

A butadiene-styrene copolymer was prepared as in Example III using 1,3,5-tri-p-tolyl-1,4-pentazdiene as the initiator except that the mercaptan employed was 0.4 part tertiary dodecyl mercaptan. At the end of a seven-hour reaction period the conversion had reached 85.1 per cent.

Example VIII

The preparation of 1,3,5-triphenyl-1,4-pentazdiene was effected in a manner similar to that given in Example I by diazotizing aniline and coupling the product with an additional quantity of the same amine.

This pentazdiene was employed in the following polymerization recipe:

| | Parts by weight |
|---|---|
| Butadiene | 72 |
| Styrene | 28 |
| Soap flakes | 5 |
| Water | 180 |
| Primary dodecyl mercaptan | 0.5 |
| Triphenyl pentazdiene | 3.01 |

The usual polymerization procedure was followed while the temperature was held at 50° C. A 67.6 per cent conversion was attained in a reaction period of 18½ hours.

Example IX

The preparation of 1,5-di-p-tolyl-3(beta-hydroxyethyl)-1,4-pentazdiene was carried out in the following manner: p-toluidine (10.7 grams, 0.1 mol) in 50 ml. water was diazotized by adding 21 ml. of concentrated hydrochloric acid followed by a solution of 7 grams sodium nitrite in 25 ml. water. The mixture was stirred and the temperature was maintained at 0° C. during the dropwise addition of the reactants. Stirring was continued until the reaction was complete, whereupon the material was filtered, 250 ml. dimethyl Cellosolve added, and the mixture cooled to −5° C. A solution of 3.05 grams (0.05 mol) of monoethanolamine and 9 grams of potassium hydroxide in 100 ml. ethylene glycol dimethyl ether and 200 ml. water was prepared and the diazo solution added dropwise to this mixture. The temperature of the coupling reaction was maintained at −5° C. by an external cooling bath. After completion of the reaction the mixture was further cooled to −15° C. The product which precipitated was removed by filtration, washed with ice water, dried, and purified by dissolving in acetone, cooling to 0° C. and adding ice water to effect precipitation.

The pentazdiene prepared above was employed as an initiator in the following recipe:

| | Parts by weight |
|---|---|
| Butadiene | 72 |
| Styrene | 28 |
| Soap flakes | 5 |
| Water | 180 |
| Pentazdiene | 2.97 |

Polymerization was carried out at 50° C. using the conventional technique. The following time-conversion data were obtained:

| Time, hours: | Conversion, per cent |
|---|---|
| 4 | 26.3 |
| 8 | 31.8 |
| 12 | 41.7 |
| 20½ | 69.2 |

A butadiene-styrene copolymer was prepared in a manner similar to that described above using the same pentazdiene except that 0.5 part primary dodecyl mercaptan was added to the recipe. A conversion of 29.2 per cent was obtained at the end of a seven-hour reaction period.

Example X

A butadiene-styrene copolymerization was effected at 0° C. using 1,3,5-tri-p-tolyl-1,4-pentazdiene. The following recipe was employed.

| | Parts by weight |
|---|---|
| Butadiene | 72 |
| Styrene | 28 |
| Rosin soap | 7 |
| Water | 180 |
| Primary dodecyl mercaptan | 0.5 |
| Sodium Hydroxide | 0.25 |
| Sodium hydrosulfite ($Na_2S_2O_4$) | 0.1 |
| Pentazdiene | 3.43 |

Polymerization was carried out in the usual manner. The following time-conversion data were obtained.

| Time, hours: | Conversion, per cent |
|---|---|
| 3 | 5.5 |
| 6 | 23.2 |
| 9 | 29.8 |
| 12 | 36.1 |
| 18 | 46.8 |
| 27 | 47.7 |

As will be evident to those skilled in the art, various modifications of this invention can be made, or followed, in the light of the foregoing disclosure and discussion, without departing from the spirit or scope of the disclosure or from the scope of the claims.

I claim:

1. In the production of synthetic rubber by the polymerization in an aqueous emulsion of a monomeric material comprising a major amount of 1,3-butadiene and a minor amount of styrene, the improvement which comprises effecting said polymerization in the presence of a 1,5-diaryl-1,4-pentazdiene as a reaction initiator and in an amount between 0.2 to 6 parts per 100 parts of said monomeric material.

2. In the production of synthetic rubber by the polymerization in an aqueous emulsion of a monomeric material comprising a major amount of 1,3-butadiene and a minor amount of styrene, the improvement which comprises effecting said polymerization in the presence of a 1,5-diaryl-1,4-pentazdiene as a reaction initiator.

3. The process of claim 2 wherein said pentazdiene is 1,3,5-tri-p-tolyl-1,4-pentazdiene.

4. The process of claim 2 wherein said pentazdiene is 1,3,5-triphenyl-1,4-pentazdiene.

5. The process of claim 2 wherein said pentazdiene is 1,3,5-tri-p-chlorophenyl-1,4-pentazdiene.

6. In a process for the production of synthetic rubber by polymerization in an aqueous emulsion of a monomeric material comprising a major amount of a 1,3-diolefin and a minor amount of a vinyl compound copolymerizable therewith in emulsion polymerization, the improvement which comprises initiating said polymerization by incorporating in said emulsion a 1,5-diaryl-1,4-pentazdiene in an amount between 0.2 and 6 parts per 100 parts of said monomeric material.

7. The improvement of claim 6 wherein said pentazdiene is 1,3,5-tri-p-tolyl-1,4-pentazdiene.

8. The improvement of claim 6 wherein said pentazdiene is 1,3,5-triphenyl-1,4-pentazdiene.

9. The improvement of claim 6 wherein said pentazdiene is 1,3,5-tri-p-chlorophenyl-1,4-pentazdiene.

10. In a process for the production of synthetic rubber by copolymerization in an aqueous emulsion of a mixture comprising a major amount of 1,3-butadiene and a minor amount of styrene, the improvement which comprises effecting said polymerization at a temperature between −30 and 70° C. with 0.2 to 6 parts by weight, based upon 100 parts by weight of said butadiene-styrene mixture, of 1,3,5-tri-p-tolyl-1,4-pentazdiene incorporated in the reaction mixture.

11. In a process for the production of a polymeric material by polymerization of a monomeric material a conjugated diene in an aqueous emulsion, the improvement which comprises effecting said polymerization in the presence of a 1,5-diaryl-1,4-pentazdiene as a reaction initiator and in an amount between 0.2 and 6 parts by weight per 100 parts of said monomeric material.

12. An improved process for the production of synthetic rubber, which comprises polymerizing in aqueous emulsion a monomeric material comprising a 1,3-diolefin under polymerization conditions in the presence of a catalytic amount of a 1,5-diaryl-1,4-pentazdiene between 0.2 and 6 parts per 100 parts of said monomeric material.

13. An improved process for the production of a polymeric material of high molecular weight by polymerization of a monomeric material comprising an unsaturated organic compound containing an active $CH_2=C<$ group and polymerizable while dispersed in an aqueous emulsion, which comprises polymerizing such a monomeric material while dispersed in an aqueous emulsion in the presence of a 1,5-diaryl-1,4-pentazdiene.

14. In a process for the production of a polymeric material of high molecular weight by polymerization in an aqueous emulsion of a monomeric material comprising an unsaturated organic compound containing an active $CH_2=C<$ group and polymerizable when dispersed in an aqueous emulsion, the improvement which comprises initiating said polymerization by incorporating in said emulsion a 1,5-diaryl-1,4-pentazdiene in an amount between about 0.2 and 6 parts per 100 parts of said monomeric material.

15. A process for the emulsion polymerization of a monomeric material comprising a conjugated diene which is polymerizable when dispersed in an aqueous emulsion, which comprises polymerizing said monomeric material while dispersed in an aqueous emulsion in the presence of a 1,5-diaryl-1,4-pentazdiene as a reaction initiator.

16. The process of claim 13 wherein said pentazdiene is 1,3,5-tri-p-tolyl-1,4-pentazdiene.

17. The process of claim 13 wherein said pentazdiene is 1,3,5-tri-phenyl-1,4-pentazdiene.

18. The process of claim 13 wherein said pentazdiene is 1,3,5-tri-p-chlorophenyl-1,4-pentazdiene.

19. The process of claim 13 wherein said pentazdiene is 1,5-diphenyl-3-p-tolyl-1,4-pentazdiene.

20. The process of claim 13 wherein said pentazdiene is 1,5 - di-p-tolyl-3(beta-hydroxyethyl)-1,4-pentazdiene.

21. The process of claim 6 wherein said pentazdiene is 1,5-diphenyl-3-p-tolyl-1,4-pentazdiene.

22. The process of claim 6 wherein said pentazdiene is 1,5 - di-p-tolyl-3(beta-hydroxyethyl)-1,4-pentazdiene.

JOHN E. WICKLATZ.

REFERENCES CITED

The following references are of record in the file of this patent:

UNITED STATES PATENTS

| Number | Name | Date |
|---|---|---|
| 2,335,730 | Blake | Nov. 30, 1943 |
| 2,376,014 | Semon et al. | May 15, 1945 |
| 2,376,015 | Semon et al. | May 15, 1945 |